United States Patent [19]
Fukuda et al.

[11] Patent Number: 5,890,153
[45] Date of Patent: Mar. 30, 1999

[54] DATABASE LOCK CONTROL METHOD

[75] Inventors: Toshihiko Fukuda, Sakai; Susumu Kobayashi, Yokohama; Satoshi Wakayama, Sakai, all of Japan

[73] Assignee: Hitachi, Ltd., Tokyo, Japan

[21] Appl. No.: 746,904

[22] Filed: Nov. 19, 1996

[30] Foreign Application Priority Data

Nov. 20, 1995 [JP] Japan .................................. 7-300968

[51] Int. Cl.⁶ .................................................. G06F 17/30
[52] U.S. Cl. .......................................................... 707/8
[58] Field of Search .................... 707/515, 104, 707/8

[56] References Cited

U.S. PATENT DOCUMENTS

| | | | |
|---|---|---|---|
| 5,319,780 | 6/1994 | Catino et al. | 707/8 |
| 5,392,433 | 2/1995 | Hammersley et al. | 707/8 |
| 5,414,839 | 5/1995 | Joshi | 707/8 |
| 5,485,607 | 1/1996 | Lomet et al. | 707/8 |
| 5,623,659 | 4/1997 | Shi et al. | 707/8 |
| 5,680,619 | 10/1997 | Gudmundson et al. | 707/8 |
| 5,706,506 | 1/1998 | Jensen et al. | 707/8 |
| 5,737,611 | 4/1998 | Vicik | 395/726 |
| 5,742,813 | 4/1998 | Kavanagh et al. | 707/8 |

FOREIGN PATENT DOCUMENTS 7-191898  7/1995  Japan .

OTHER PUBLICATIONS

"Information Structure and Database", Iwanami Lectures of Information Science –8, 1983, pp. 158–173.

J.N. Gray et al, "Granularity of Locks in a Shared Data Base", 1st International Conference on Very Large Data Base, vol. 1, No. 1, 1975, pp. 428–451.

M.J. Carey, et al, "The 007 Benchmark", ACM SIGMOD Conference, Jun. 1993, vol. 22, No. 2, pp. 12–21.

Primary Examiner—Paul R. Lintz
Assistant Examiner—Ella Colbert
Attorney, Agent, or Firm—Fay, Sharpe, Beall, Fagan, Minnich & McKee

[57] ABSTRACT

In a database management system for concurrently executing a plurality of transactions for access to a database, there is provided a user interface for defining a parent/child relationship between a plurality of pieces of data. The parent information of data is added to the data itself and to a storage location information of the data in the database. Upon access to data, lock control is performed by use of the parent information of the data, thereby performing representation of locked a object.

10 Claims, 13 Drawing Sheets

DATABASE LOCK CONTROL METHOD

BACKGROUND OF THE INVENTION

1. Field of the Invention

This invention relates to a database system having a lock control function, and particularly to a lock control method for representing locking of lockable objects.

2. Description of the Related Art

In a database (hereinafter, abbreviated to as DB) system, a lock control facility is provided by a DB management system (hereinafter, abbreviated to as DBMS) for managing a DB in the order to assure consistency in DB when a plurality of transactions are concurrently executed.

The fundamental lock control of the DB is described in "INFORMATION STRUCTURE AND Database, IWANAMI Lectures of Information Science-8, 1983" (Document 1). Here, two different lock modes, or exclusive lock and share lock, are described.

A transaction exclusively locks data being updated. The exclusive lock does not allow other transactions to refer to nor update the locked data. On the other hand, a transaction performs a share lock on data for reference only. The share lock allows the other transactions to refer to the locked data but does not allow them to update it.

The problems associated with the lock control includes a trade off between the transaction concurrence based on the granularity of the locked data unit and the overhead in the lock control processing.

A method, concerning this problem, of efficiently controlling locks by use of lock control rules based on a hierarchy relationship between locked data is described in "Granularity of Locks in a Large Shared DataBase", J. N. Gray, R. A. Lorie and G. R. Putzolu, Proc. 1st International Conference on Very Large Database, 1975 (Document 2).

For example, in a relational database system, since the database consists of a group of tables each of which consists of a group of records, a hierarchy can be constructed in this order (database>table>record). Here, five different lock modes are used which include lock modes having a notion of intention in addition to the above-mentioned two lock modes.

When a transaction performs an exclusive lock on a certain record, it also performs an exclusive intention lock on the table ranking superior to the record. Then, when the other transactions refer to the other records belonging to that table, they should request a for share lock on the table, but the lock does not conflict with the exclusive intention lock. Thus, all transactions can be executed concurrently.

However, when records are updated, the exclusive intention share lock is requested on the table, but the lock conflicts with the exclusive intention lock. Thus, since there is no lock conflict on each record, the overhead for lock control can be reduced.

The relationship among such lock modes is shown in Table 1 (page 434) of Document 2.

In addition, a method of reducing the overhead in a lock control process is described in JP-A-7-191898 (Document 3).

In this method, a table for exclusive control is provided in which predetermined items for exclusive control are registered, and when values of the corresponding items are being locked, the lock control table is checked for the registration, so that the amount of input data for lock control can be reduced and that the overhead for lock control can be reduced.

A model capable of a benchmark test in a DB system presented in "The 007 Benchmark", Carey Michael J., DeWitt David J., Naughton Jeffery F., Proc. ACM SIGMOD Conference, June 93 (Document 4) has a mode in which data of one hundred million pieces or more can be treated.

In this case, when the data length of one record of the lock management table is assumed to be about 100 bytes, simultaneous lock control on data of one hundred million pieces or more will need a memory region of 10 gigabytes or more. In this mode, lock control is also made in a data page unit having a plurality of pieces of data, so that the number of records in the lock management table can be reduced.

SUMMARY OF THE INVENTION

As described in Document 3, a method of decreasing the record length of the lock management table is able to reduce the lock management table to only about several tenths.

In addition, as described in Documents 2 and 4, the number of data being locked is reduced by using units ranking superior to the data in a hierarchy as lock unit. In this method, however, the hierarchy depends upon the physical structure of the DB. This physical structure does not always match with the logical model that a user designs.

It is an object of the invention to provide a lock control method for a database system in which a representation of lockable data is performed by making the logical lock relationships among data and using the relationships, thereby reducing the overhead of lock control.

The lockable object to be actually managed in lock control (ranking superior in the subordinate relationship of lock, and representative of a plurality of lockable objects) is called a "representative lock parent". Also, the lockable object not actually managed in lock control (ranking inferior in the subordinate relationship of lock) is called a "representative lock child". This lock control method is called "the representation of lock".

In order to achieve the above object, the present application provides a user with an interface that defines the parent/child relationship between a plurality of pieces of data. Also, the data and the storing information in the database are added with the parent information of the data. In addition, the present application performs lock control by use of the parent information of the data upon access to the data.

Therefore, the pieces of data belonging to the same level in a hierarchy can have a relationship therebetween independently of the physical structure.

Moreover, because the parent/child relationship, and the number of children relative to a certain parent can be freely set by the user, more effective lock control can be carried out.

DESCRIPTION OF THE PREFERRED EMBODIMENTS

An embodiment of the invention will be described in detail with reference to the accompanying drawings.

Figure 1:
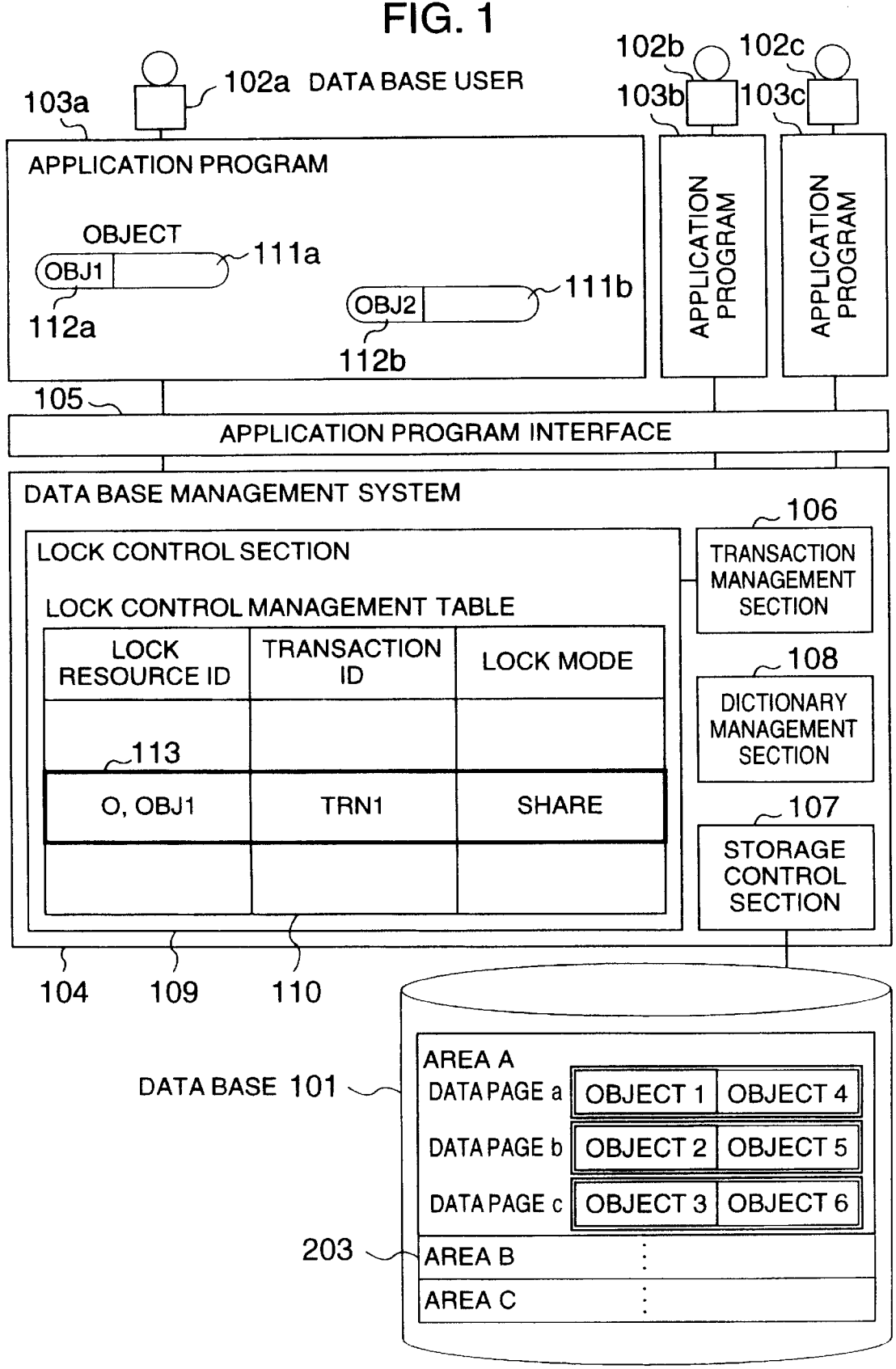
FIG. 1 is a diagram of the construction of a system according to the present invention.

FIG. 1 shows the construction of a DB system to which this invention is applied. This example is an application of the invention to an object-oriented database system.

A database file 203 within a database 101 is divided into a plurality of areas A to C, and each area is further divided into a plurality of data pages. The data pages store the data of corresponding types, respectively. For example, it is assumed that the database 101 is a database associated with the components of the automobile. Then, data page a stores data (objects) of the car's model, which are type a data, data page b stores data of color, which are data page b data, and type c stores data of datas page, which are type c data.

Users 102a to 102c access the DB 101 through application programs 103a to 103c (hereinafter, abbreviated to AP).

An application program interface 105 (hereinafter, abbreviated to as API) is placed between the application programs and a DBMS (database management system) 104 for managing the DB, thereby enabling the users to use the DB. The API acts to start transactions, commit transactions, generate objects, activate objects, initialize AP process regions, release the AP process regions, and so on. The actions of the API will be described later.

The DBMS 104 includes a lock control section 109 for lock control on the DB, a transaction management section 106 for managing transactions, a dictionary management section 108 having tables of object types and data structures, and a storage control section 107 for controlling objects to be stored in the DB.

The DBMS 104 also includes a serial number management section 205 for managing the serial number of object identifier (hereinafter, abbreviated to OID), and an OID-storage information index management section 207 being a table of OID and storage locations on the DB. The DB 101 includes a serial number recording section 206 as backup images of serial number management section 205, and an OID-storage information index file 208 as backup images of OID-storage information index management section 207. These elements will be described with reference to FIG. 2.

The DBMS 104 assigns object identifiers (OIDs) 112a through 112b to objects 111a through 111b in order to identify the objects uniquely in the DB system.

The AP specifies the objects being operated by use of the OIDS. The lock control on the objects needs to identify respective objects as lockable objects. Here, for lock control management, the identifiers for uniquely identifying the lockable objects in the system are called lock resource ID.

The lock resource ID 113 for an object is constructed by the combination of the flag that indicates a kind of lock resource (in this case, object), and an OID. Similarly, the lock resource IDs for area and type are constructed by the combination of the flag indicating the kind of lock target and the lock target ID (area ID or type ID).

The lock control management table 110 within the lock control section 109 is constructed by the following items:

(a) lock resource ID
(b) transaction ID that keeps the locked state
(c) lock mode The item (a) is used to register the lock resource ID for the lock target.

The item (b) is used to register the ID (TID) for a transaction that keeps the locked state of the lock target in item (a). The transaction ID is assigned from the transaction management section 106 when the transactions start.

The item (c) is used to register the lock modes with which the lock targets are locked, or values indicating exclusive mode, share mode and so on.

The transaction necessary for lock control requests the lock with the lock resource ID, the transaction ID, and the lock mode to the lock control section 109. The lock control section 109 searches the lock control management table 110 to check if the same lock resource ID is registered. If it is registered, the accessibility or inaccessibility to the corresponding target is determined in accordance with the relationship between the registered lock mode and the requested lock mode. If the lock resource ID is not registered, it is registered in the table 110, and the access to the corresponding target is allowed. This method is the same as in the conventional lock control.

The API 105 and the DBMS 104 can be accomplished by software to be executed by a processor (CPU) and a memory in the database system, and tables on the memory.

Figure 2:
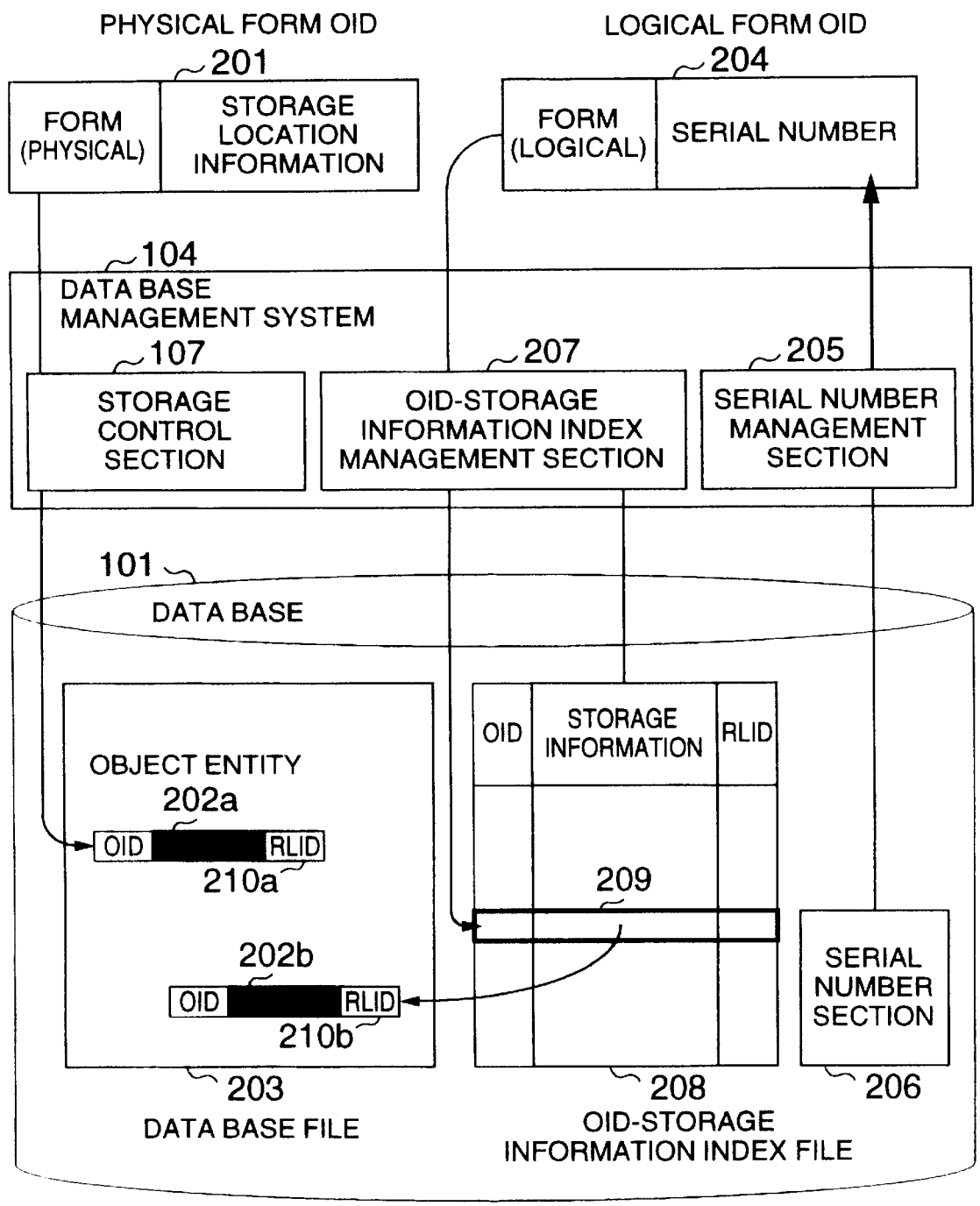
FIG. 2 shows the structure of an OID (Object Identifier) and the locations of stored objects.

FIG. 2 show the structure of OID and storage locations of objects.

The OID used in this example is one of logical form and physical form. Either one is selected according to the usage of the DB.

The physical form OID 201 is formed of directly coded information of a location at which an object entity 202a is stored in the database file 203 and a flag indicating a physical form OID. This physical OID is used particularly for fast access to an object stored in the DB. The information of location is formed of area ID, type ID and offset within the data page.

The identifier having coded storage location information of an object is called physical object identifier, or physical OID (hereinafter, abbreviated to as POID).

The logical form OID 204 is formed of a coded value (serial number) uniquely defined within the DB system and a flag indicating a logical form OID. This logical form OID is used for the case where the object operation requires the flexible relationship between the object identification and the entity storage location, that is not affected by the physical storage structure. (The serial number is uniquely assigned within the system by the serial number management section 205 of DBMS 104 and the serial number recording section 206 of DB 101).

If the storage location of an object is changed, the location-changed object cannot be correctly accessed by the physical form OID. In addition, if another object is stored at the storage location of the original object, then another object is identified by the physical form OID of the original object. Thus the unique identification by the OID can not be performed.

Since the identification ability of the logical OID is independent of the storage location information, the identification ability of the OID once assigned to an object can be maintained irrespective of the chang of storage location of the object as long as the mapping between the OID and the object is maintained to be correct.

Since the logical form OID is independent of the storage location of the corresponding object entity, it is necessary to use something for knowing the storage location of the object entity from the logical form OID. Here, the mapping therebetween is managed by use of an index mechanism (hereinafter, called the OID-storage information index) having values of object entity storage location information (corresponding to the previously mentioned POID) with the logical form OID used as a key.

The OID-storage information index is managed by the OID-storage information index management section 207 of DBMS 104 and the OID-storage information index file 208 of DB 101.

When an object associated with the logical form OID 204 is to be obtained, storage information 209 is acquired from the OID-storage information index by using the OID as a key, and the object entity 202b is obtained on the basis of the storage information.

Here, the logical form OID is called logical object identifier, or logical OID (hereinafter, abbreviated to LOID).

According to this embodiment, the logical relationship on the lock control between objects can be defined by user upon generation of the object. In an example of DB 101, an application program can define the model in which color data and tire data are depending on the car model data. Thus, the car model data is a parent of the color data and tire data. When the child data is controlled to be locked, the parent data identifier is alternatively used to perform the lock representation.

In the lock representation, the lock object to be actually managed in lock control (ranking superior in the subordinate relationship of lock, and representative of a plurality of lockable objects) is called the "representative lock parent". Also, the lock object not to be actually managed in lock control (ranking inferior in the subordinate relationship of lock) is called the "representative lock child".

To achieve the lock representation, when a certain representative lock child is to be locked, lock management is performed by use of the lock resource ID corresponding to the representative lock parent, not corresponding to the lock object itself.

A certain object having a representative lock parent, and the parent OID in the case of having the representative lock parent are indicated by a representative lock ID (RLID).

The representative lock ID is defined when a certain object is generated. Only a single one parent, or representative lock ID can be defined for a certain object.

A parent object may have an arbitrary number of children. The parent object may be combined with any one of the children objects without limited by their physical object locations.

If the above parent/child relationship is so defined that a plurality of transactions do not simultaneously access one group of a parent and its children, more effective lock control can be realized.

It is not necessary for a parent object to be a real data. The parent object may be a virtual data identified by a virtual DID.

The representative lock ID is stored within each record 209 of OID-storage information index 207, 208 and added to each object entity 202a within the database file 203.

Figure 3:
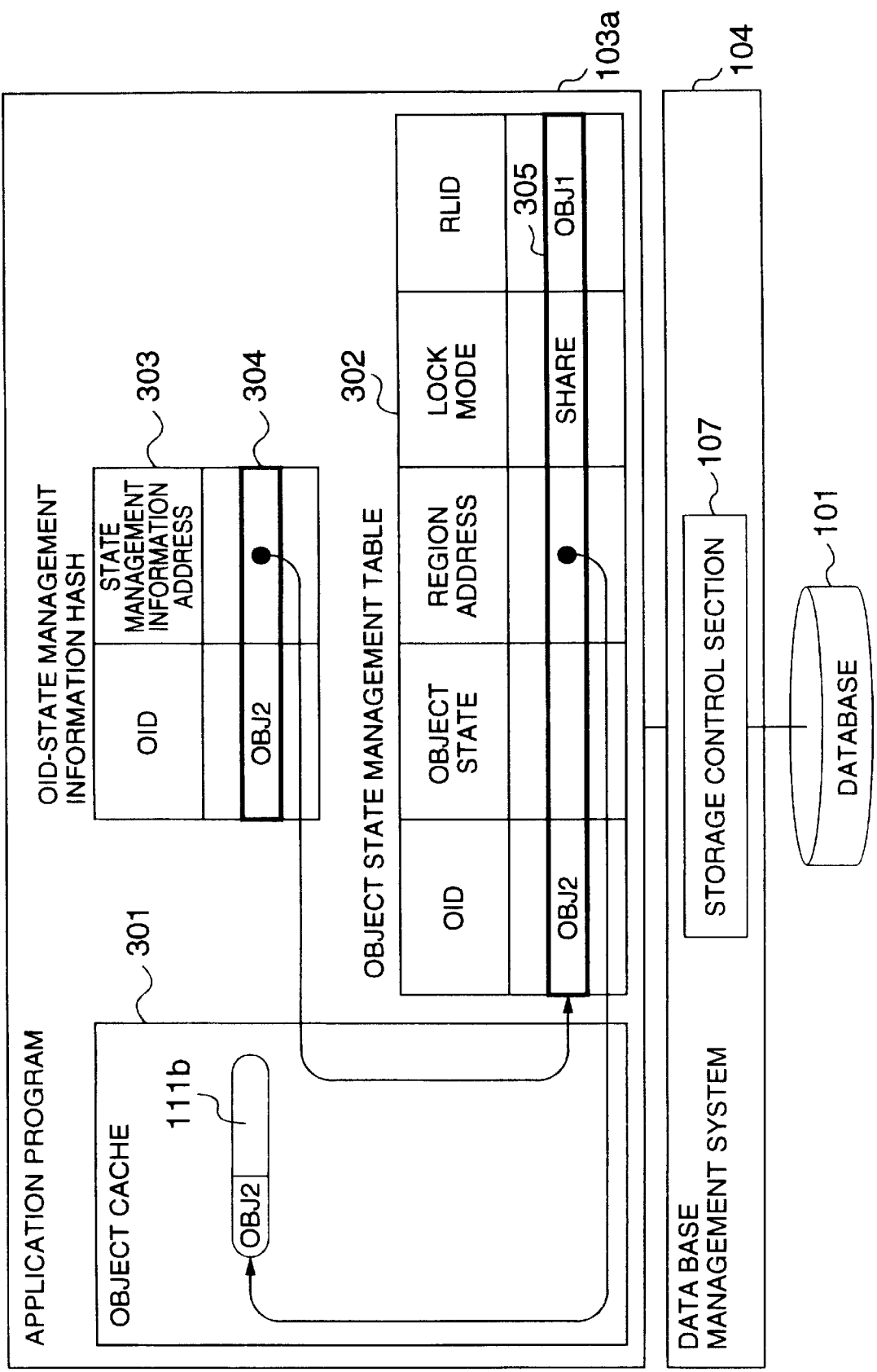
FIG. 3 is a diagram for explaining the reference to an object in an AP (application program) process.

FIG. 3 is a diagram for explaining the reference to objects in an AP process.

When the AP 103a requests the reference to objects, the DBMS 104 copies the contents of the objects which the DB system manages into an AP process region of the main memory of the computer executing the AP, and the address is fed back to the AP. (This copy process will be described in detail later.)

The object 202a stored in the DB 101 is obtained by notifying the storage control section 107 of a storage location.

The AP refers to the object-copied region of the main memory. The region into which an object is copied in an AP process is called an object cache 301. The activation of the object means that the object managed by the DB system is fixed in the object cache so as to be referred to by the AP. The state of the activated object is managed by an object state management table 302.

The object state management table 302 includes the following items:

(a) OID
(b) object state (created/updated)
(c) head address in the object region on object cache
(d) acquired lock mode
(e) representative lock ID For all objects activated by AP 103a, the information of the states on the cache are registered on the object state management table 302.

When the activation is requested with an OID designation for an already activated object, a hash organization is employed in order to know the state of the object on the object cache. The hash organization is inputted with the OID as a key and outputs the head address of the corresponding entry of the object state management table 302. Here, this hash is called an OID-state management information hash 303.

For example, in FIG. 3, the object which has OID obj2 is activated, and an entry 304 for this object is registered in the OID-state management information hash 303. The head address of the record of an entry 305 of the object state management table can be acquired on the basis of the entry 304. This record 305 shows that the share lock is kept on the object and that the representative lock parent ID is obj1.

Figure 4:
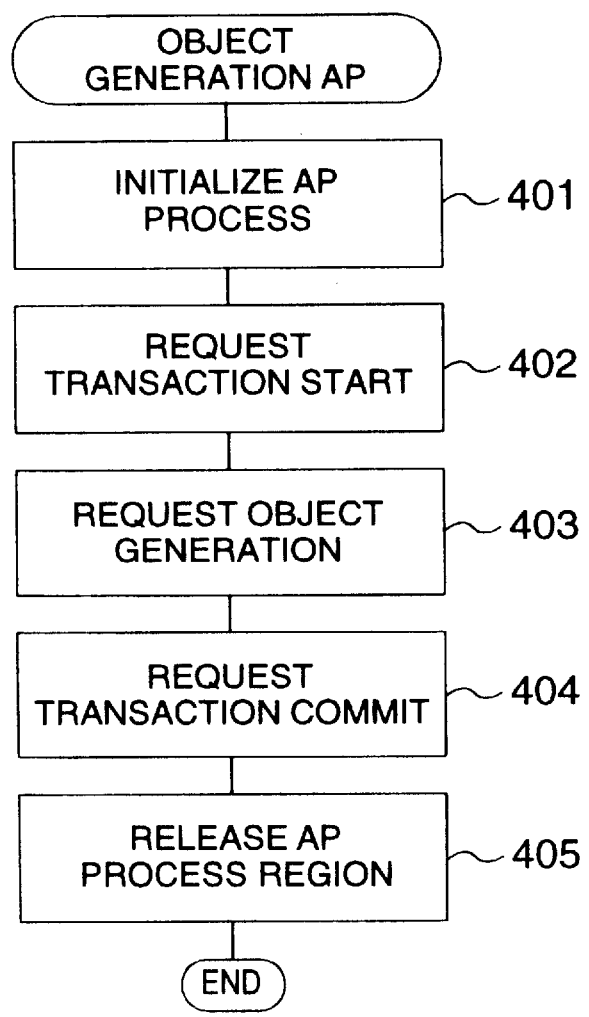
FIG. 4 is a flowchart of an AP process for generating an object.

FIG. 4 shows an example of AP process for generating objects using the API 105.

First, at step 401, the AP process region initializing the API is called to initialize the object cache region 301, object state management table 302 and OID-state management information hash 303.

Then, at step 402, the transaction start API is called.

This API permits DBMS 104 to recognize a request for a sequence of operations which the AP makes to DB 101 as a logical operation unit (transaction). The transaction is identified by the transaction ID (TID).

Thereafter, at step 403, the object generation API is called. At this time, the type of an object being generated, the area in which the object is stored, the form of OID and the representative lock parent are defined. This API determines the data structure of the object according to the contents previously defined by the dictionary management section 108 and the designated object type. Then, the AP produces the object entity.

At step 404, the transaction commit API is called.

After the transaction is normally started, the operations requested to DBMS are transmitted to the transaction management section 106 and managed as a transaction by the time when the transaction commit API is called.

When the transaction commit API causes the transaction to end so that the transaction commit is properly finished, the DB operations in the transaction are reflected to the DB through the storage control section 107. Thus, the object on the cache is stored in the DB.

Finally, as step 405, the AP process region release API is called, and the region for the AP process is released, the AP coming to an end.

Figure 5:
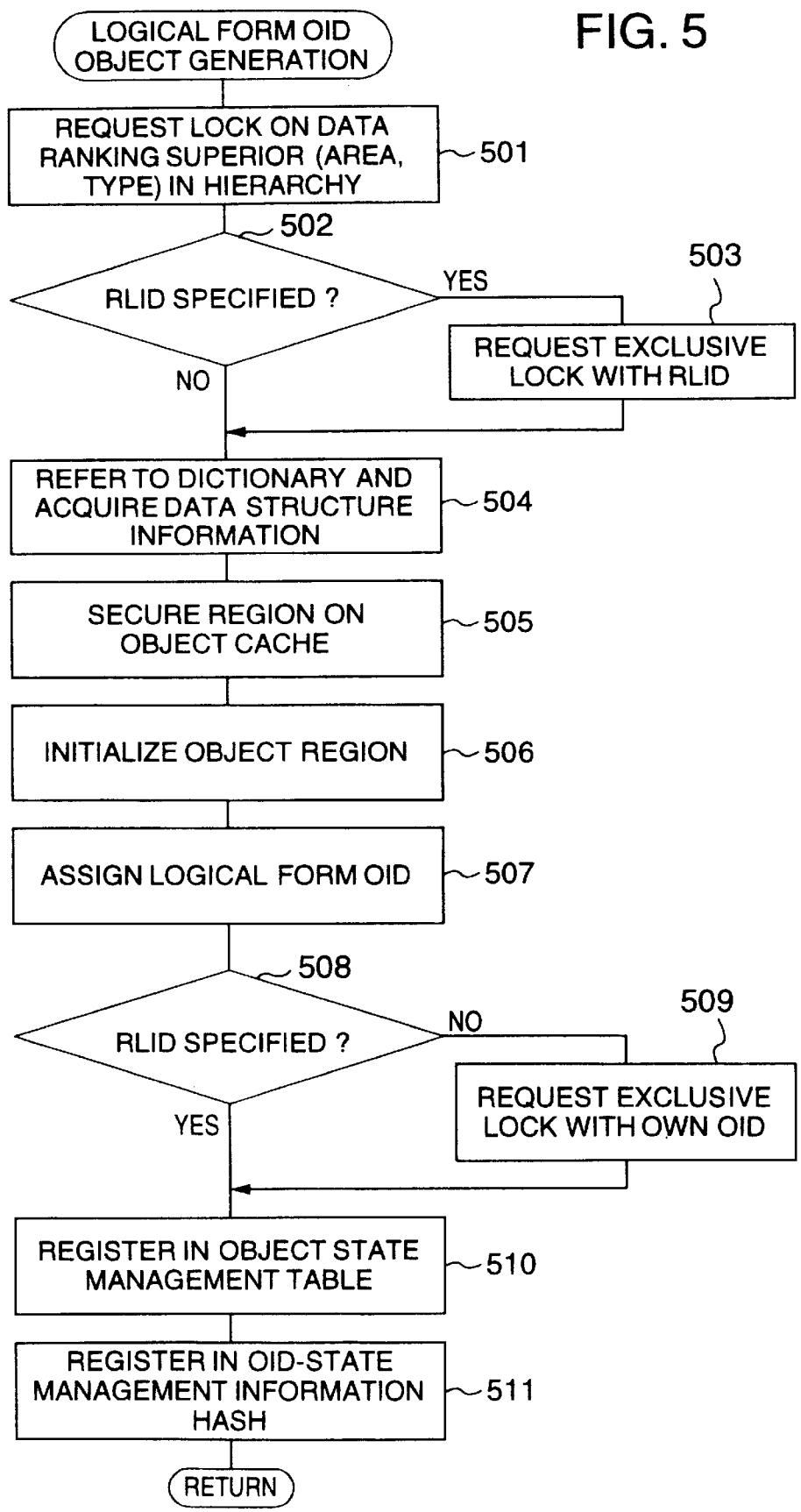
FIG. 5 is a flowchart of the process for generating an object with a logical-form OID.

FIG. 5 shows the process of the object generation API with the logical form OID.

First, at step 501, the process makes an intention exclusive lock on the area and type ranking superior in a hierarchy. Then, at step 502, it is checked if the representative lock ID (RLID) is designated by a parameter. If it is designated, the exclusive lock is requested with the parent ID at step 503.

Moreover, at step 504, the dictionary 108 is referred to, and the data structure information is acquired from the specified type.

At step 505, the region on the object cache is secured on the basis of the data structure information acquired at step 504. At this time, a region for an object control header is secured at the head of the object region, and the individual control information (own OID) of each object is held therein.

At step 506, to hold objects in the region secured at step 505, the region is initialized according to the data structure acquired at step 504.

At step 507, the serial number obtained by the serial number management section 205 is assigned to objects as the logical form OID. At this time, the own OID is stored in the object control header.

At step 508, it is again checked if the representative lock parent is designated by parameter. If it is not designated, exclusive lock is requested with the lock resource ID of the own new OID at step 509.

At step 510, the information of the object being created is registered in the object state management table 302. Here, a value indicating that this object is new is set in the item "object state". In addition, a value indicating "exclusive" is set in the item "acquired lock mode", and the lock object ID of the representative lock parent is set in the item "representative lock ID (RLID)".

At step 511, information of the corresponding object is registered in the OID-state management information hash 303, and this process ends.

The registration in this OID-state management information hash makes the generated object active. The API returns the region address on the object cache as output parameter. The user creates the entity in the object region of the object cache 301. At this time, the new object is not stored in the DB, but only stays in the object cache 301. The transaction commit process can make it be stored in the DB 101.

Figure 6:
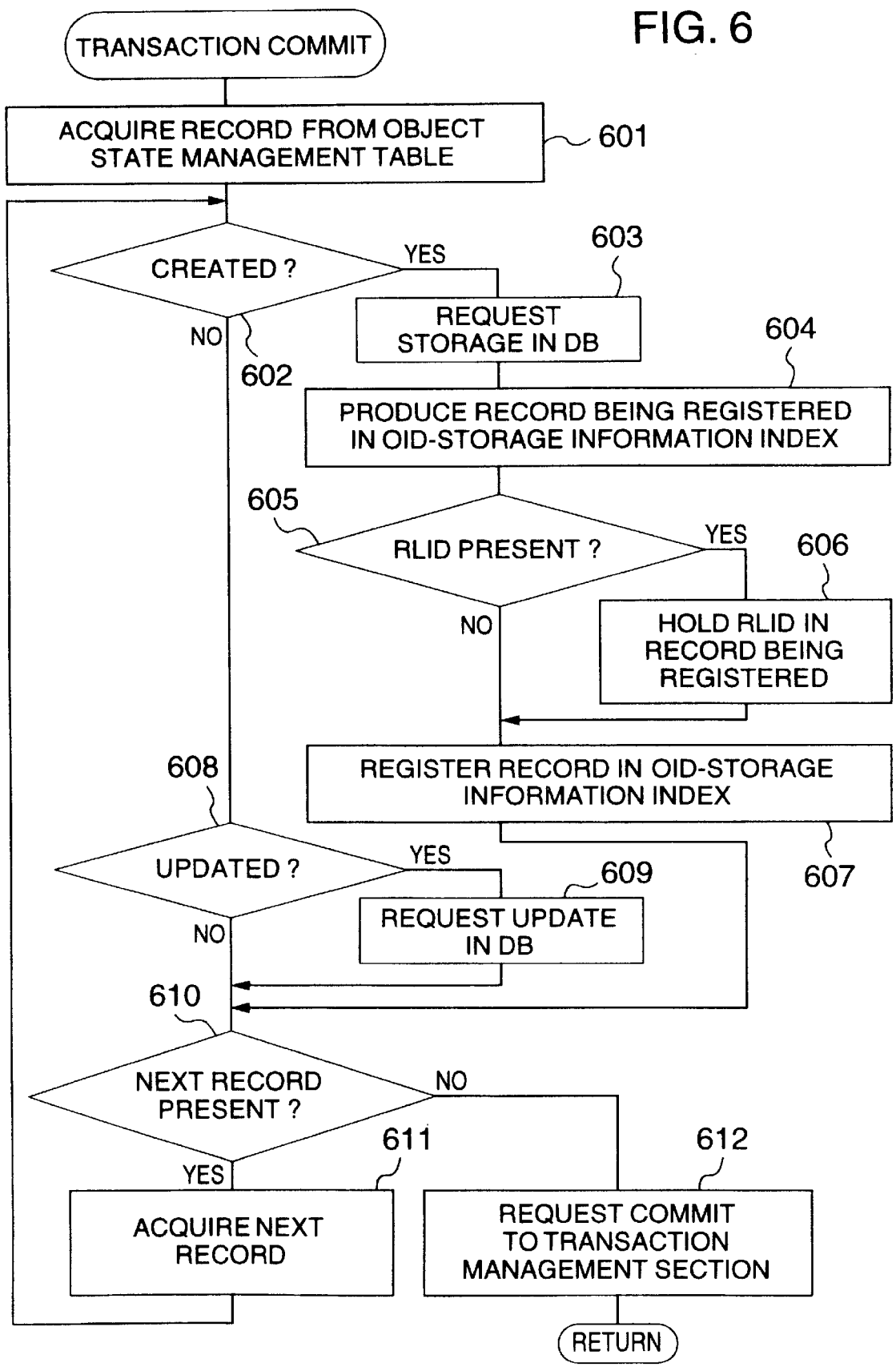
FIG. 6 is a flowchart of the transaction commit process.

FIG. 6 shows the process of the transaction commit API.

At step 601, a record is acquired from the object state management table 302 in order that an object to be stored in the DB on the object cache 301 is obtained.

At step 602, it is checked if the item "object state" is "created".

If it is "created", the object is newly stored in the DB 101 at step 603, and when the storage location is determined, a record for the OID-storage information index 207, 208 is produced at step 604.

At step 605, it is checked from the object state management table 302 if the representative lock parent is present. If it has a parent, the parent ID is added to the record being registered at step 606, and the produced record is registered in the OID-storage information index at step 607. At this time, the registered record includes information of area ID and type ID associated with this object.

When the object state is not "created" at step 602, it is checked at step 608 if the state is "updated".

If it is "updated", at step 609 the storage control section 107 is requested so that the contents of the object on the cache can be reflected on DB.

At step 610, it is checked if the next record is present in the object state management table 302.

If the next record is present, the next record on the object state management table is acquired at step 611, and then the process goes to step 602.

If the next record is not present, the transaction commit is declared to the transaction management section 106 at step 612. The transaction management section 106 refers to the lock control management table 110, and releases all locks held by the transaction.

Figure 7:
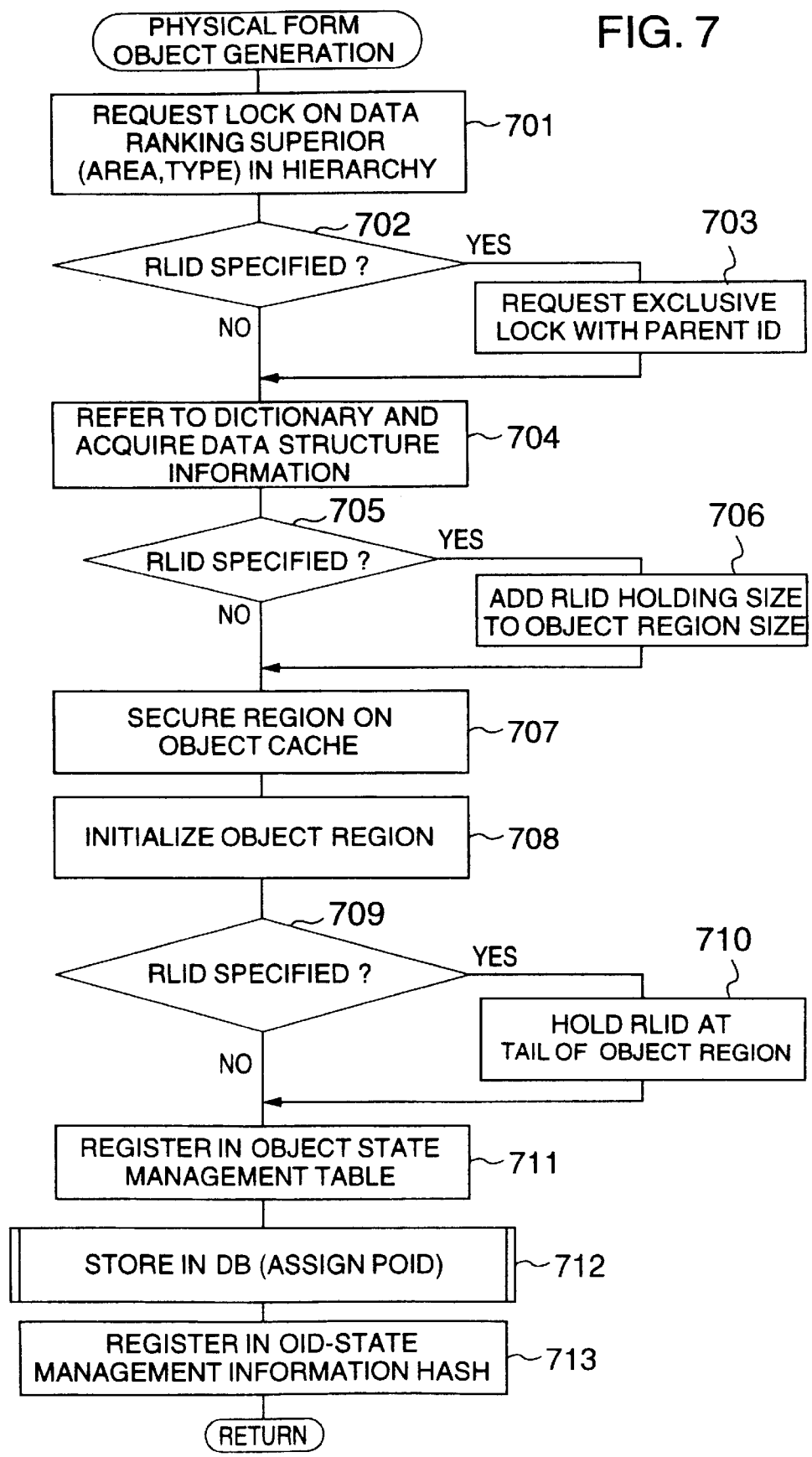
FIG. 7 is a flowchart of the process for generating an object with a physical-form OID.

FIG. 7 shows the process for the object generation API with the physical form OID.

First, at step 701, the area and type ranking superior in a hierarchy are locked in the intention exclusive lock mode.

At step 702, it is checked if the representative lock ID is designated by parameter. If it is designated, the exclusive lock is requested with the ID at step 703.

At step 704, the process refers to the dictionary 108, and acquires the data structure information associated with the specified type.

At step 705, it is again checked if the representative lock ID is specified by parameter. If it is specified, a size for holding the ID is added to the object region size at step 706.

At step 707, the region is secured on the object cache 301.

At step 708, the region secured at step 707 is initialized according to the data structure acquired at step 704.

A step 709, it is checked again if the representative lock ID is designated. If it is designated, the ID is stored at the tail of the object region at step 710.

At step 711, for the record in the object state management table 302, a value of "exclusive" is set in the item "acquired lock mode", and the representative lock ID is set in the item "RLID". Here, "updated" is set in the item "object state". In addition, other information of the object is also set.

At step 712, the object on the cache 301 is stored in the DB 101, and the physical form OID (POID) is assigned thereto.

At step 713, the object is registered in the OID-state management information hash 303. The API returns the region address on the object cache 301. The user produces an entity on the object region in the object cache 301. In the case of physical form OID, since information on the object storage location is specified by OID, it is not necessary to register the object in the OID-storage information index 207, 208.

Figure 8:
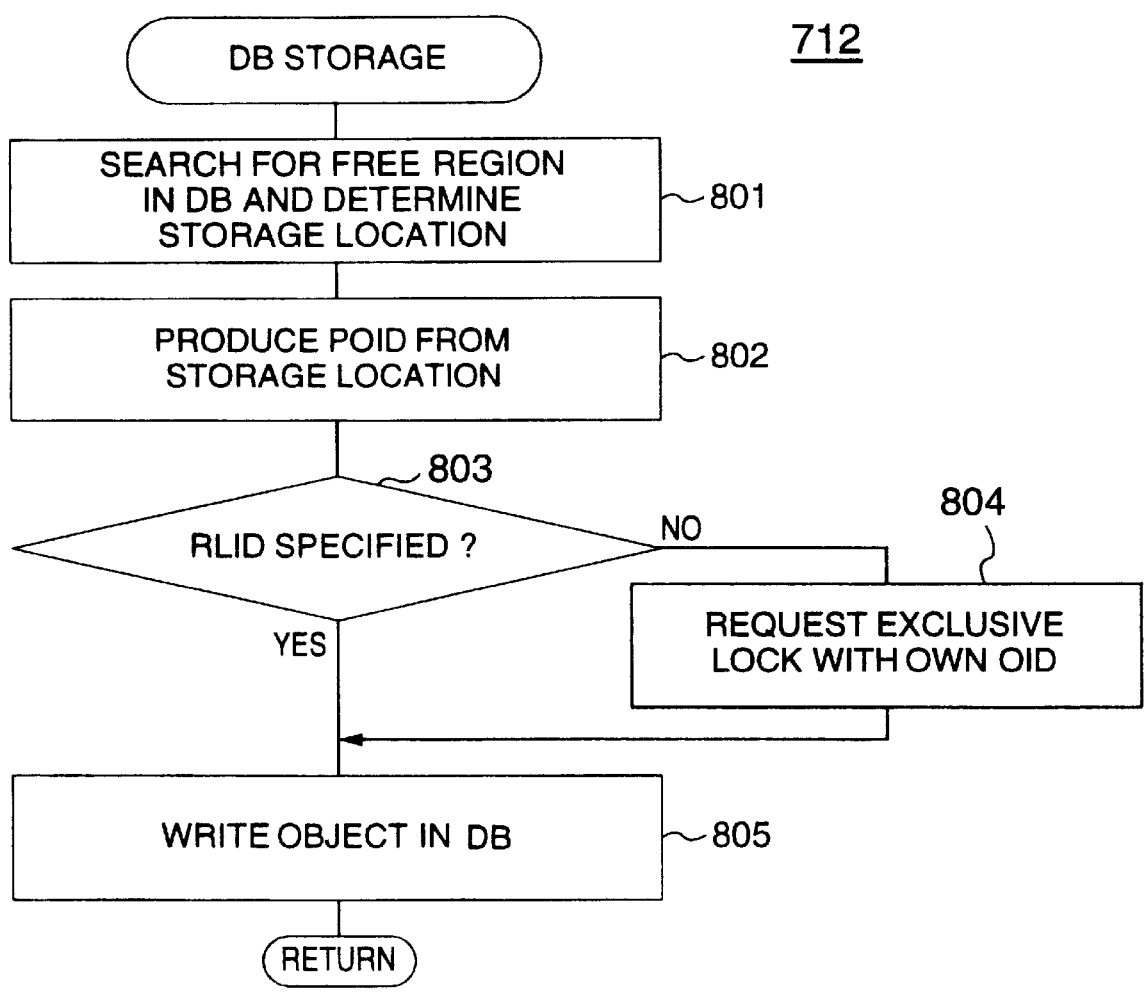
FIG. 8 is a flowchart of the process for storing the physical-form OID object.

FIG. 8 shows the process for storing the object with the physical form OID at step 712 in FIG. 7.

First, at step 801, the process searches for a free region which matches with required area ID and type ID of the DB 101, and determines the storage location.

At step 802, the physical form OID is assigned on the basis of the storage location information.

At step 803, it is checked if the representative lock ID is designated by parameter. If it is not designated, exclusive lock is fastened with its own OID at step 804.

At step 805, the object on the cache 301a is written in the DB 101, and the process ends.

Figure 9:
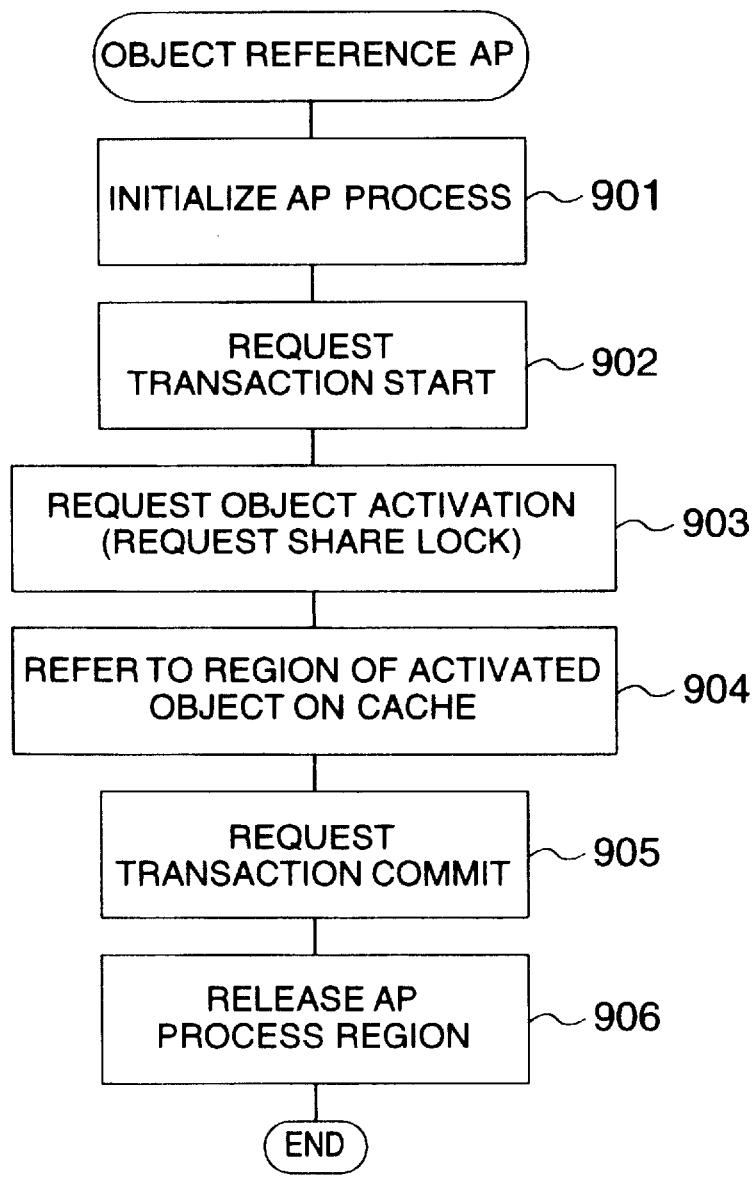
FIG. 9 is a flowchart of the AP process referring to an object.

FIG. 9 shows an example of the AP process referring to objects.

At step 901, the process calls the AP process region initializing API.

At step 902, the process calls the transaction start API.

At step 903, the process calls the object activation API. At this time, the process specifies the type, OID and lock mode (share) of the object being activated.

At step 904, the process refers to the region of the object activated at step 903.

At step 905, the process calls the transaction commit API to unlock.

At step 906, the process calls the AP process region release API, and the AP ends.

Figure 10:
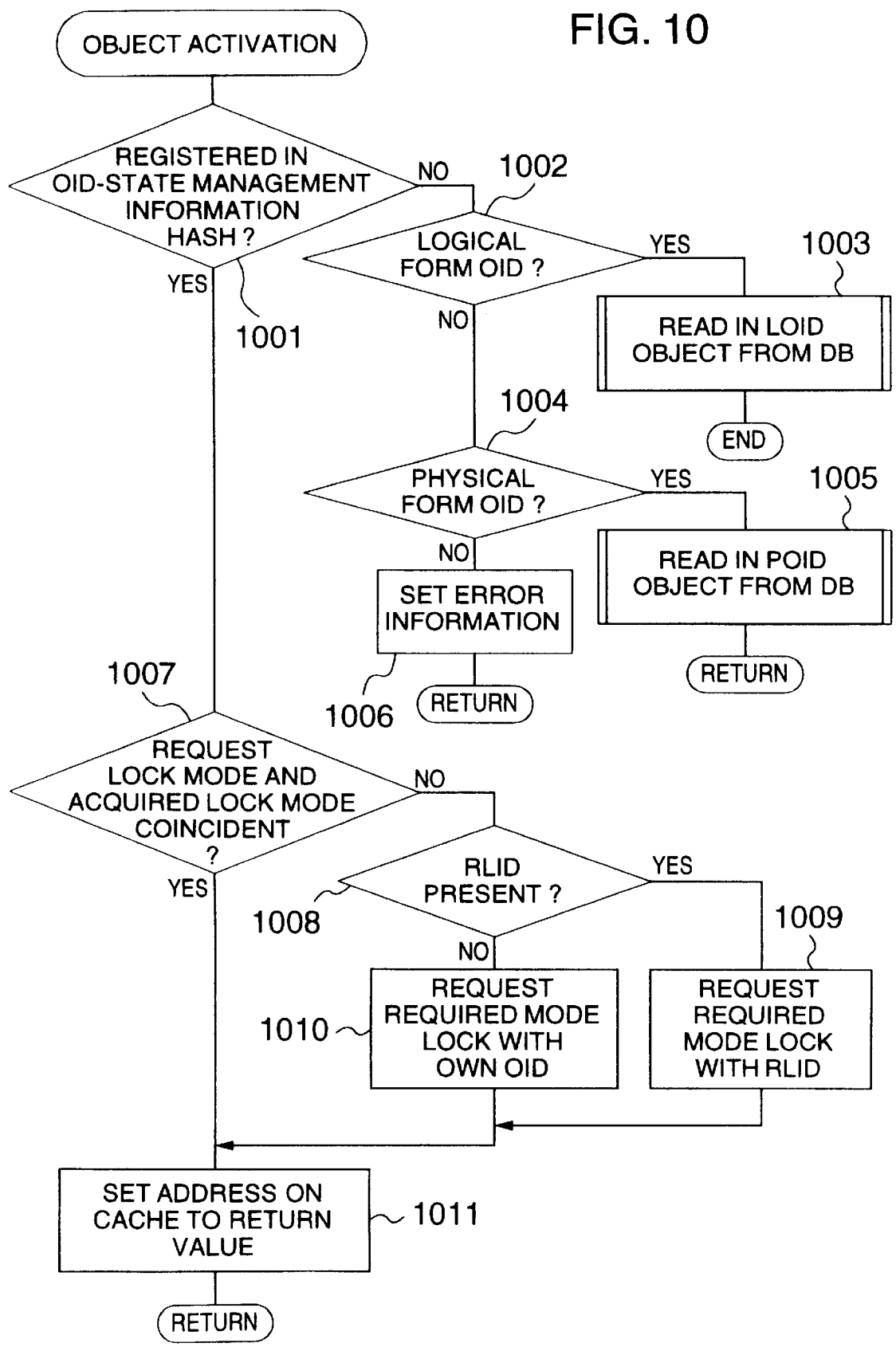
FIG. 10 is a flowchart of the object activation process.

FIG. 10 shows the process of the object activation API.

First, at step 1001, it is checked if the OID specified for activation is registered in the OID-state management information hash 303.

If it is not registered, it is checked if the OID in the input parameter is in logical form at step 1002.

If it is in logical form, the object with logical form OID is read from the DB 101 and stored in the cache 301 (as described in detail later with reference to FIG. 11) at step 1003, and the process ends.

Figure 12:
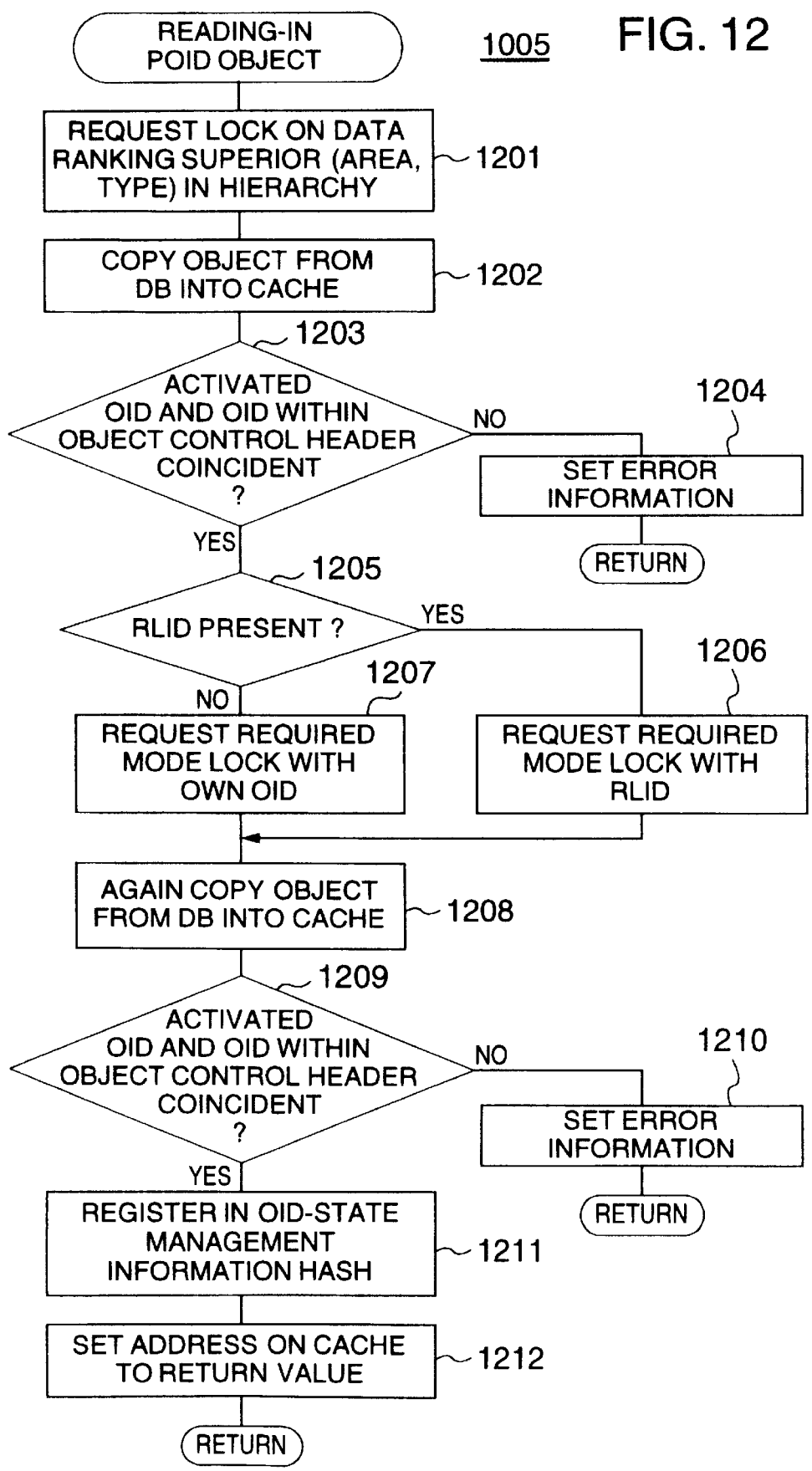
FIG. 12 is a flowchart of the process for reading the physical-form OID object from the DB.

If it is not in logical form, it is checked if the OID is in physical in form at step 1004. If it is physical form, the object with physical form OID is read from the DB (as shown in FIG. 12) at step 1005, and the process ends.

If it is not in physical form, the process produces error information indicating "the specified OID is incorrect in form" at step 1006, and the process abnormally ends.

If the OID has been already registered in the OID-state management hash 303 at step 1001, that is, if the object is already read and stored in the cache 301, the process refers to the record of the object state management table 302 indicated by the hash, and it is checked if the lock mode requested by the AP coincides with the already acquired lock mode at step 1007.

If it does not coincide, it is checked if the representative lock ID is present in the record of the object state management table 302 at step 1008. If the ID is present, at step 1009 the lock control section 109 is requested to lock with the ID with the lock mode specified by the parameter.

If the representative lock ID is not present, the lock control section is requested to lock with the OID of the object itself with the specified lock mode at step 1010.

When the locking is performed, the lock mode is held in the record of the object state management table 302.

At step 1011, the item "head address of object region" of the record of the object state management table 302 is set as the return value, and the process ends.

Figure 11:
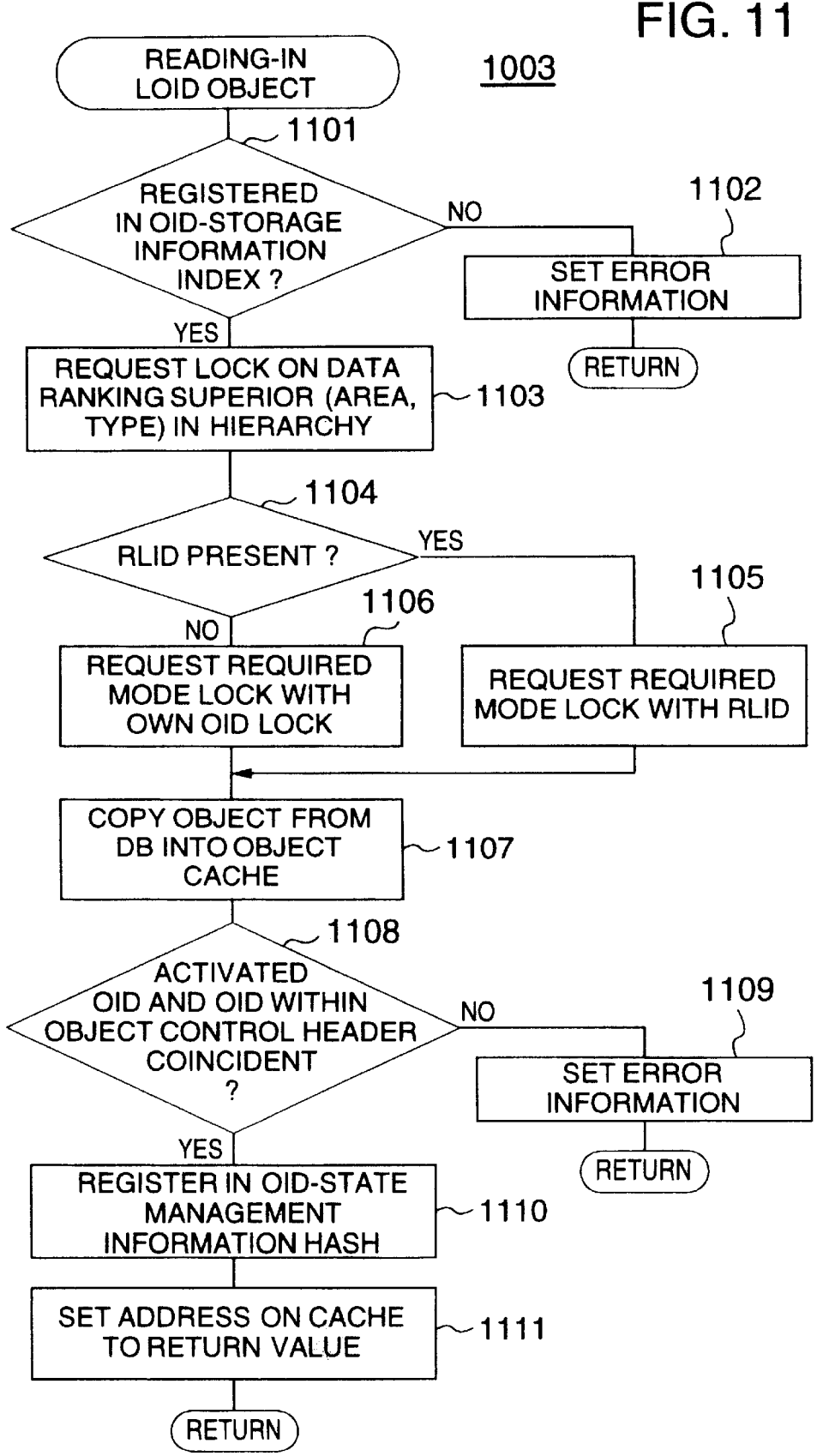
FIG. 11 is a flowchart of the process for reading a logical-form the OID object from DB.

FIG. 11 shows the process of reading the logical form OID object from the DB, which corresponds to step 1003 in FIG. 10.

First, at step 1101, it is checked if the OID is registered in the OID-storage information index 207. If it is not registered, error information indicating "object is not present in DB" is set as the return value at step 1102, and the process abnormally ends.

If it is registered, at step 1103 the area ID and type ID are acquired from the values obtained from the index, and the lock is requested with the ID ranking superior in a hierarchy.

At step 1104, it is checked if a representative lock parent is present on the index 207. If a parent is present, at step 1105 the lock control section is requested to lock with the parent ID with the lock mode required by the AP.

If a parent is not present, at step 1106 the lock control portion is requested to lock with the OID of the object itself with the lock mode required by AP.

Then, at step 1107, the storage location information is acquired from the value obtained from the index, the storage location of the object entity is inputted to the storage control section 107, and the object is acquired from the DB and copied into the object cache 301.

At step 1108, it is checked if the OID held at the object control header of the read object on the cache coincides with the OID indicated in this process. The reason why such check is made here is that since the object is not locked when the storage information is acquired from the OID-storage information index at step 1101, it should be confirmed that the object has not been changed by another transaction by the time when it is locked.

If those OIDs are not coincident, error information indicating "object is not present in DB" is set as the return value at step 1109, and the process abnormally ends.

If those OIDs are coincident, the object information is registered in the object state management table 302, and further registered in the OID-state management information hash 303 at step 1110.

The head address of the object region is set as the return value at step 1111, and the process ends.

FIG. 12 shows the process of reading the physical form OID object from DB, which corresponds to step 1005 in FIG. 10.

First, at step 1201, the area ID and type ID specified by the AP are used to lock on superior rank in a hierarchy.

At step 1202, the storage control section 107 is inputted with the storage location of the object entity stored in the OID, acquires the object in DB 101 and copies it into the object cache 301.

At step 1203, it is checked if the OID held at the object control header of the object on the cache 301 coincides with the OID indicated by this process.

If those OIDs are not coincident, error information indicating "object is not present in DB" is set as the return value at step 1204, and the process abnormally ends.

At step 1205, the process refers to the object on the cache, and checks if the representative lock ID is held at the tail of the object region.

If the representative lock ID is present, at step 1206 the lock control section is requested to lock with the ID with the lock mode required by the AP.

If the representative lock ID is not present, at step 1207 the lock control section is requested to lock with the OID of the object itself with the lock mode required by the AP.

After it is locked, the object is again copied from DB into the cache at step 1208. The reason is that since the object has not been locked at step 1202, the contents of the object are not guaranteed.

At step 1209, it is again checked if the OID held at the object control header of the object on the cache coincides with the OID indicated by this process.

If those OIDs are not coincident, error information indicating "object is not present in DB" is set as the return value at step 1210, and the process abnormally ends.

If those OIDs are coincident, information of the object is registered in the object state management table 302, and further registered in the OID-state management information hash 303 at step 1211.

At step 1212, the head address of the object region is set as the return value, and the process ends.

Figure 13:
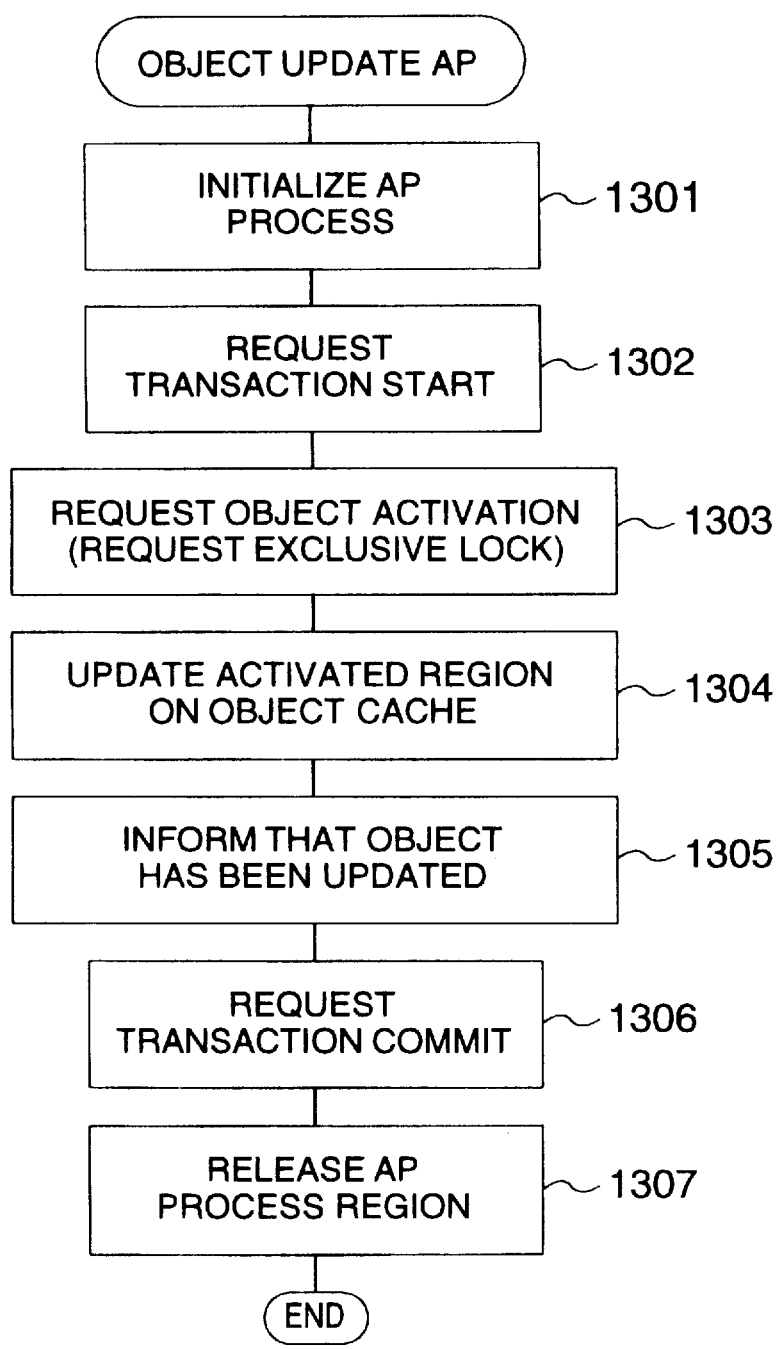
FIG. 13 is a flowchart of the AP process for updating an object.

FIG. 13 shows an example of the process of AP for updating the object.

At step 1301, the process calls the AP process region initializing API.

At step 1302, the process calls the transaction start API.

At step 1303, the process calls the object activation API. At this time, the process specifies the type, OID and lock mode (exclusive) of the object being activated.

At step 1304, the process updates the activated object region.

At step 1305, the DBMS 104 is informed that the object has been updated. In other words, "updated" is set in the item "object state" of the record of the object state management table.

At step 1306, the process calls the transaction commit API.

At step 1307, the process calls the AP process region release API, and the AP ends.

The request for the update by this process is reflected on the DB by the transaction commit process previously shown in FIG. 6.

As mentioned above, this lock control works in case of object updating.

This embodiment employs both the lock control using the area/type/object hierarchy and the representative lock control using the parent/child logical relationship between objects. However, the representative lock control may independently be employed.

In addition, while this embodiment adds the parent ID to the tail of the object entity when the representative lock parent is present, the object entity may have the parent ID at any part of the object.

What is claimed is:

1. A lock control method in a database management system for concurrently executing a plurality of transactions for access to a database, comprising the steps of:

arbitrarily defining in accordance with an indication of a user a parent/child relationship between a plurality of data being lock controlled wherein said parent/child relationship is logical and independent of the data physical structure; and when attempting to access said data being locked, locking on said data with data corresponding to the parent in case said the parent is defined for said data, and locking on said data with said data itself in case no parent is defined for said data, wherein one parent can be defined for each of said plurality of data, and any of said plurality of data can share one parent.

2. A lock control method according to claim 1, further comprising the steps of:

adding information indicating a parent/child relationship defined by user to said data within said database.

3. A lock control method according to claim 2, wherein said data being lock controlled are objects, and said lock control employs as a lock resource name an object identifier for uniquely identifying an object within the system, said object including a parent object identifier when a parent is defined for said object.

4. A lock control method according to claim 3, wherein said parent/child relationship is defined when generating the object.

5. A database management system for concurrently executing a plurality of transactions for access to a database, comprising:

means for arbitrarily defining in accordance with an indication of a user a parent/child relationship between a plurality of data being lock controlled wherein said parent/child relationship is logical and independent of the data physical structure;

means for storing said parent/child relationship defined by user; and means for locking on said data with data corresponding to the parent in case the parent is defined for said data, and locking on said data with the data itself in case no parent is defined for said data, and for attempting to access said data, wherein said means for defining the parent/child relationship allows only one parent to be defined for each of said plurality of data, and allows any of said plurality of data to share the single parent.

6. A database management system according to claim 5, wherein said data being lock controlled are objects, said lock control employs as a lock resource name an object identifier for uniquely identifying an object within the system, and said means for defining said parent/child relationship is included in means for generating objects.

7. A database management system according to claim 6, wherein said means for storing said parent/child relationship is the object itself, said object including a parent object identifier when a parent is defined for said object.

8. A database management system according to claim 6, wherein said means for storing said parent/child relationship is a table of said object identifier and the associated parent object identifier.

9. A database management system according to claim 6, wherein said means for attempting to access said objects includes object generating means for newly generating an object on a memory, object activating means for reading out an object on said memory from said database, and object storage means for reflecting the object on said memory on to said database.

10. In a database management system for concurrently executing a plurality of transactions for access to a database, a program storage device readable by the system, storing:

means for arbitrarily defining in accordance with an indication of a user a parent/child relationship between a plurality of data being lock controlled wherein said parent/child relationship is logical and independent of the data physical structure;

means for storing said parent/child relationship defined by the user; and means for locking on said data with the data corresponding to the parent when said parent is defined for said data and locking on said data with the data itself when no parent is defined for data, and for attempting to access said data.

* * * * *